(12) United States Patent
Hsieh et al.

(10) Patent No.: US 9,234,528 B2
(45) Date of Patent: Jan. 12, 2016

(54) MOTOR BASE

(71) Applicant: Sunonwealth Electric Machine Industry Co., Ltd., Kaohsiung (TW)

(72) Inventors: Kun-Li Hsieh, Kaohsiung (TW); Chien-Liang Lin, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 392 days.

(21) Appl. No.: 13/798,577

(22) Filed: Mar. 13, 2013

(65) Prior Publication Data

US 2014/0010636 A1    Jan. 9, 2014

(30) Foreign Application Priority Data

Jul. 5, 2012    (TW) .............................. 101124245 A

(51) Int. Cl.
*H02K 5/24* (2006.01)
*F04D 29/66* (2006.01)
*F04D 25/06* (2006.01)

(52) U.S. Cl.
CPC ............ *F04D 29/66* (2013.01); *F04D 25/0613* (2013.01); *F04D 29/668* (2013.01); *H02K 5/24* (2013.01)

(58) Field of Classification Search
CPC ................................... H02K 5/04; H02K 5/24
USPC ....................................................... 310/51, 89
See application file for complete search history.

(56) References Cited

U.S. PATENT DOCUMENTS

| 7,030,527 B2* | 4/2006 | Tsuda et al. ..................... 310/90 |
| 7,857,583 B2 | 12/2010 | Horng et al. |
| 8,754,555 B2* | 6/2014 | Kim et al. .................. 310/68 R |
| 2012/0011522 A1* | 1/2012 | Rhee et al. ..................... 720/695 |

FOREIGN PATENT DOCUMENTS

| CN | 201636086 U | 11/2010 |
| TW | 483658 U | 4/2002 |

* cited by examiner

*Primary Examiner* — Burton Mullins
(74) *Attorney, Agent, or Firm* — Alan D. Kamrath; Kamrath IP Lawfirm, P.A.

(57) ABSTRACT

A motor base includes a bottom plate and at least one vibration reduction unit. The bottom plate has opposite top and bottom surfaces. A shaft-coupling portion is arranged on the top surface. The at least one vibration reduction unit encloses the shaft-coupling portion. Each of the at least one vibration reduction unit includes at least one protrusion and at least one groove. The at least one protrusion is arranged on one of the top and bottom surfaces. The at least one groove is correspondingly arranged on the other one of the top and bottom surfaces.

11 Claims, 10 Drawing Sheets

MOTOR BASE

BACKGROUND OF THE INVENTION

1. Field of the Invention

The present invention generally relates to a motor base and, more particularly, to a motor base that is designed to reduce the noise of the motor by reducing the reverberation energy resulting from the vibration of the motor.

2. Description of the Related Art

Referring to FIG. 1, Taiwan Patent No. 1318559 discloses a motor base 7 of a conventional motor that is designed to reduce the reverberation energy resulting from the vibration of the motor. The motor base 7 includes a base plate 71 having a plurality of annular grooves 72. A shaft tube 711 is mounted on the base plate 71 to support a rotating impeller. The annular grooves 72 enclose the shaft tube 711 to reduce the reverberation energy resulting from the rotation of the impeller.

Due to the arrangement of the annular grooves 72 on the base plate 71, the parts of the base plate 71 which form the annular grooves 72 are thinner, resulting in a weaker structural strength of the motor base 7. As a result, when the motor base 7 is mounted with components such as the impeller, a stator or a circuit board, the motor base 7 may not sufficiently support the motor. Disadvantageously, the quality of the motor is poor, and the service life of the motor is shortened.

To solve the problem, China Patent Application No. 201020004026.0 discloses a fan frame 8 that is designed to reduce the vibrational force during operation. The fan frame 8 includes a base plate 81 and a separating portion 82. A shaft-coupling portion 811 is mounted on the base plate 81. The separating portion 82 surrounds the shaft-coupling portion 811 to reduce the vibrational force and noise. The separating portion 82 has a greater thickness than other parts of the base plate 81, achieving a reinforced structural strength of the fan frame 8.

Although the separating portion 82 provides both advantages of strengthening the fan frame 8 along with relieving the vibrational force placed upon the fan frame 8, the ability of the separating portion 82 to reduce the vibrational force is not as effective as the annular grooves 72 of the motor base 7 due to the fact that the separating portion 82 has a greater thickness than the rest of the portions of the base plate 81.

Referring to FIG. 3, Taiwan Patent No. 483658 also discloses a conventional fan frame 9 capable of reducing the vibrational force during operation. The fan frame 9 includes a base 91 and a plurality of bridging members 92. The base 91 is mounted with a shaft tube 911. The bridging members 92 are connected between the base 91 and an outer ring 93. Each bridging member 92 has a bent section 921 capable of reducing the internal and external vibrations of the fan frame 9.

Due to the facts that the bridging members 92 are connected to the outer ring 93 and that the bent section 921 is arranged on a respective bridging member 92, the bridging members 92 are not connected to the base 91 in a secure manner due to the bent sections 921. In addition, since the bent sections 921 are positioned on the bridging members 92 only, the bridging members 92 cannot be arranged on the entire periphery of the base 91. Consequently, the bent sections 921 cannot omnidirectionally reduce the reverberation energy resulting from the vibration of the shaft tube 911.

SUMMARY OF THE INVENTION

It is therefore the objective of this invention to provide a motor base that is designed to have sufficient structural strength to efficiently and omnidirectionally reduce the reverberation energy resulting from the vibration of the motor.

One embodiment of the invention discloses a motor base comprising a bottom plate and at least one vibration reduction unit. The bottom plate has opposite top and bottom surfaces. A shaft-coupling portion is arranged on the top surface. The at least one vibration reduction unit encloses the shaft-coupling portion. Each of the at least one vibration reduction unit includes at least one protrusion and at least one groove. The at least one protrusion is correspondingly arranged on one of the top and bottom surfaces. The at least one groove is arranged on the other one of the top and bottom surfaces.

In a preferred form shown, the at least one protrusion comprises a single protrusion arranged on the top surface, and the at least one groove comprises a single groove correspondingly arranged on the bottom surface.

In the preferred form shown, the bottom plate further comprises an inner end portion and an outer end portion opposite to the inner end portion.

The inner end portion is coupled with the shaft-coupling portion, and the outer end portion extends outwards in a horizontal direction of the bottom plate. The top surface comprises a first top surface, a second top surface and a third top surface. The first top surface is positioned between the protrusion and the inner end portion, the second top surface is positioned on the protrusion, and the third top surface is positioned between the protrusion and the outer end portion. The first and third top surfaces are aligned with each other in a radial direction of the shaft-coupling portion, and the second top surface is not aligned with the first and third top surfaces in the radial direction of the shaft-coupling portion. Alternatively, the first, second and third top surfaces are positioned on different planes in the axial direction of the shaft-coupling portion.

In the preferred form shown, the second top surface is positioned on a plane higher than the first and third top surfaces.

In the preferred form shown, the bottom plate further comprises an inner end portion and an outer end portion opposite to the inner end portion. The inner end portion is coupled with the shaft-coupling portion, and the outer end portion extends outwards in a horizontal direction of the bottom plate. The outer end portion has a connection portion extending in an upward direction perpendicular to the top surface or extending outwards in an oblique angle with respect to the bottom plate. The connection portion is adapted to couple with ribs or stationary blades.

In the preferred form shown, the at least one protrusion comprises three protrusions, and the at least one grooves comprises three grooves. Two of the three protrusions and one of the three grooves are arranged on the top surface. The groove that is arranged on the top surface is positioned between the two protrusions that are arranged on the top surface. The other two of the three grooves and the other one of the three protrusions are arranged on the bottom surface. The protrusion that is arranged on the bottom surface is positioned between the two grooves that are arranged on the bottom surface. The two grooves on the bottom surface are opposite to the two protrusions on the top surface, and the protrusion on the bottom surface is opposite to the groove on the top surface.

In the preferred form shown, the bottom plate has a first thickness and a second thickness. The first thickness is the thickness of the bottom plate at the at least one vibration reduction unit, and the second thickness is the thickness of the bottom plate at the rest of the portions of the bottom plate. The first thickness is equal to the second thickness.

In the preferred form shown, at least one recess or at least one truncated portion is formed on each of the at least one protrusion.

In the preferred form shown, the at least one vibration reduction unit comprises a plurality of vibration reduction units. A portion of the vibration reduction units is arranged along a circular path of an outer ring, and the other portion of the vibration reduction units is arranged along a circular path of an inner ring surrounded by the outer ring. The vibration reduction units of the outer ring are annularly spaced from each other by a plurality of gaps. The vibration reduction units of the inner ring are annularly spaced from each other and interlaced with the vibration reduction units of the outer ring.

In the preferred form shown, the at least one protrusion is arranged on one of the top and bottom surfaces, and the at least one groove is correspondingly arranged on the other one of the top and bottom surfaces.

In the preferred form shown, the arc length of each vibration reduction unit of the inner ring is larger than the gap between two adjacent vibration reduction units of the outer ring.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
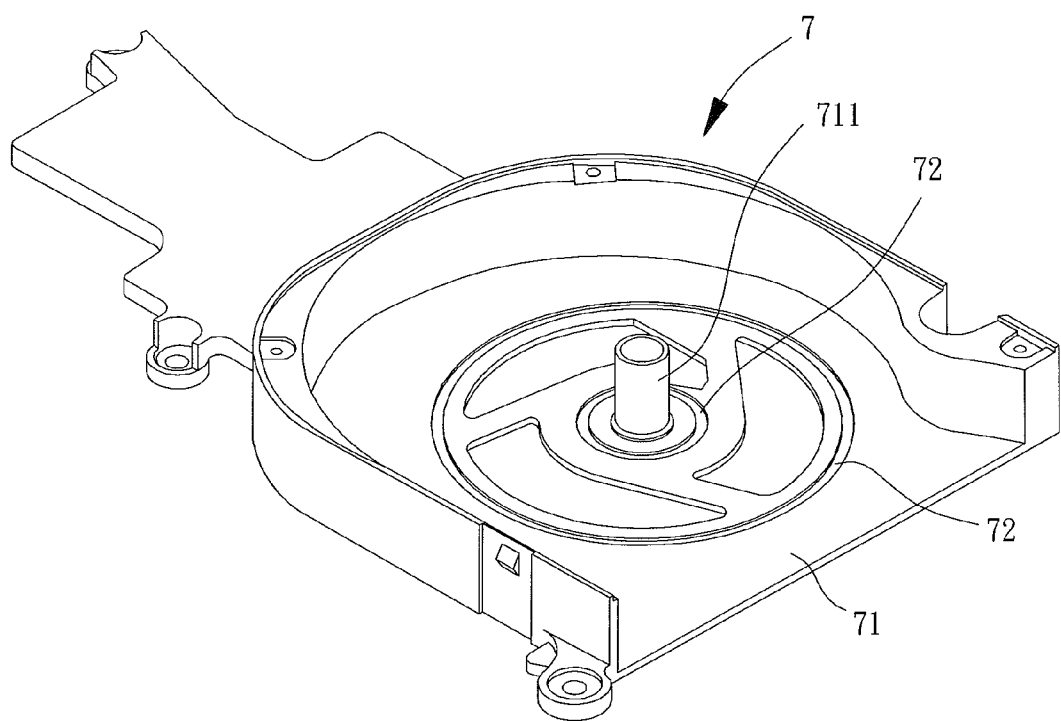
FIG. 1 shows a conventional motor base.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 4:
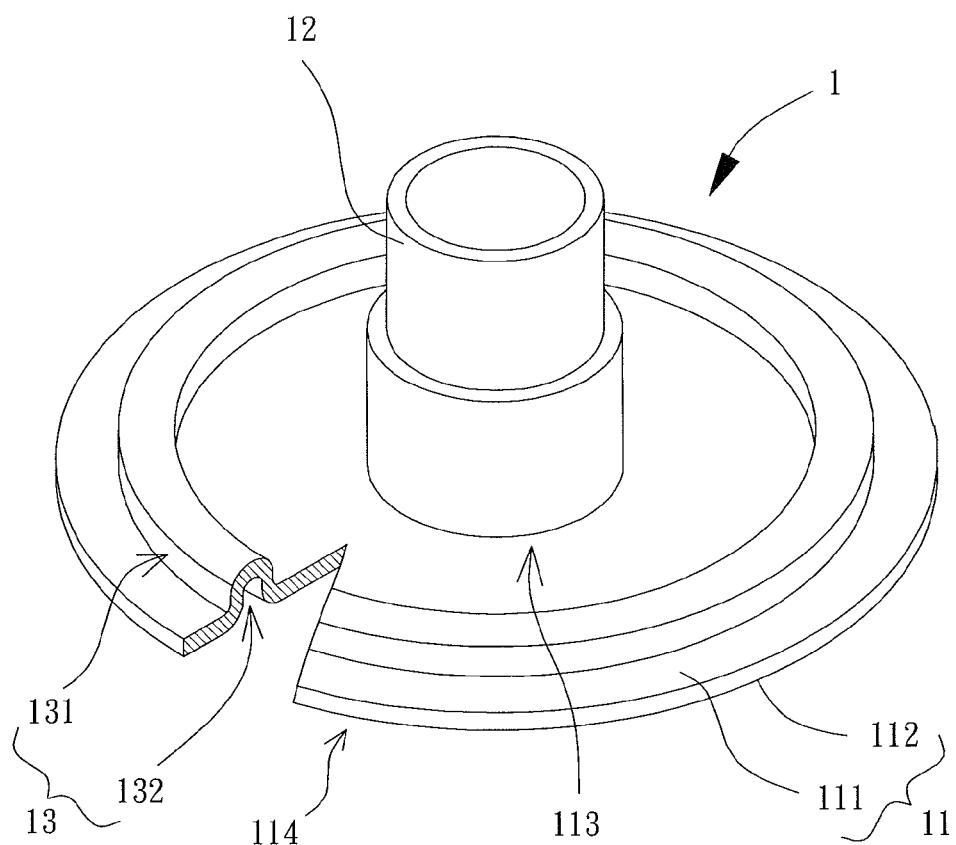
FIG. 4 shows a motor base according to a preferred embodiment of the invention.

FIG. 4 shows a motor base 1 according to a preferred embodiment of the invention. The motor base 1 includes a bottom plate 11 having opposite top and bottom surfaces 111 and 112. A shaft-coupling portion 12 is arranged on the top surface 111. The shaft-coupling portion 12 may be of any structure that can be coupled by a shaft. As an example, the shaft-coupling portion 12 may be a shaft tube capable of receiving a variety of components such as a bearing, a wear-resisting plate, an engaging plate or a positioning ring.

The motor base 1 further includes a vibration reduction unit 13 that encloses the shaft-coupling portion 12 in order to reduce the vibrational force and noise. The vibration reduction unit 13 includes at least one protrusion 131 and at least one groove 132. The protrusion 131 is arranged on the top surface 111, and the groove 132 is arranged on the bottom surface 112. In this arrangement, the cross section of the vibration reduction unit 13 may resemble the shape of "11", "U","0" or the like. Based on the above structure, the motor base 1 may further include the following modifications, as described below.

Figure 5:
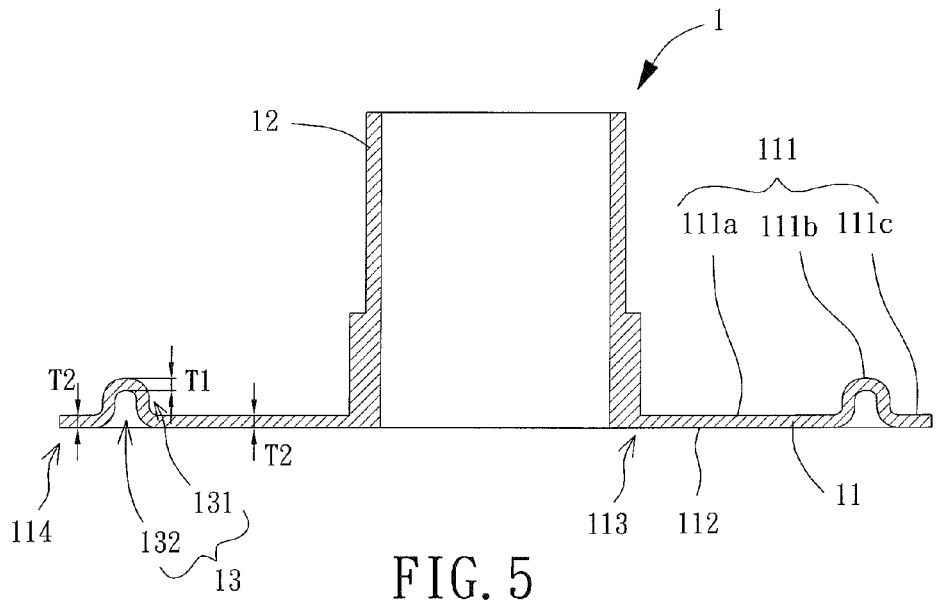
FIG. 5 is a cross-sectional view of the motor base according to a first modification of the preferred embodiment of the invention.

Referring to FIG. 5, the vibration reduction unit 13 includes only one protrusion 131 and one groove 132. The protrusion 131 is arranged on the top surface 111 of the bottom plate 11, and the groove 132 is arranged on the bottom surface 112 of the bottom plate 11. The bottom plate 11 includes an inner end portion 113 and an outer end portion 114 opposite to the inner end portion 113. The shaft-coupling portion 12 may be integrally formed with or assembled to the inner end portion 113. The outer end portion 114 extends outwards in a horizontal direction of the bottom plate 11. The top surface 111 includes a first top surface 111a, a second top surface 111 b and a third top surface 111 c. The first top surface 111a is positioned between the protrusion 131 and the inner end portion 113. The second top surface I 1 lb is positioned on the protrusion 131. The third top surface 111c is positioned between the protrusion 131 and the outer end portion 114. In the embodiment, the first top surface 111 a and the third top surface 111 c are positioned on the same plane (or aligned with each other in a radial direction of the shaft-coupling portion 12), whereas the second top surface 111 b is positioned on a different plane from the first top surface 111 a and the third top surface 111c (or the second top surface 111b is not aligned with the first top surface lila and the third top surface 111 c in the radial direction of the shaft-coupling portion 12). In this arrangement, the vibration reduction unit 13 is able to reduce the reverberation energy resulting from the vibration of the shaft-coupling portion 12, achieving outstanding vibration reduction.

Figure 6:
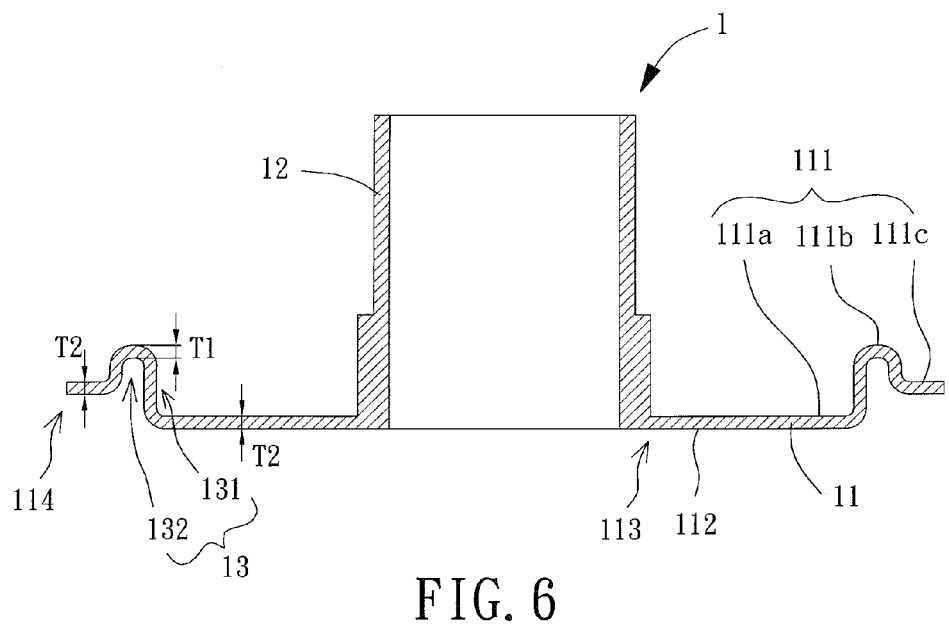
FIG. 6 is a cross-sectional view of the motor base according to a second modification of the preferred embodiment of the invention.

Referring to FIG. 6, the vibration reduction unit 13 also includes one protrusion 131 and one groove 132. The protrusion 131 is arranged on the top surface 111 of the bottom plate 11, and the groove 132 is arranged on the bottom surface 112 of the bottom plate 11. The bottom plate 11 includes an inner end portion 113 and an outer end portion 114. The shaft-coupling portion 12 may be integrally formed with or assembled to the inner end portion 113. The outer end portion 114 extends outwards in the horizontal direction. The top surface 111 includes a first top surface 111a, a second top surface 111b and a third top surface 111c. The first top surface 111a is positioned between the protrusion 131 and the inner end portion 113. The second top surface 111b is positioned on the protrusion 131. The third top surface 111c is positioned between the protrusion 131 and the outer end portion 114. In the embodiment, the first top surface 111a, the second top surface 111b and the third top surface 111 c are positioned on different planes. In this arrangement, the vibration reduction unit 13 is able to reduce the reverberation energy resulting from the vibration of the shaft-coupling portion 12, achieving outstanding vibration reduction. Specifically, the second top surface 111b is positioned on a plane higher than the first top surface 111a and the third top surface 111c. In this arrangement, the vibration reduction unit 13 is able to efficiently reduce the reverberation energy resulting from the vibration of the shaft-coupling portion 12, achieving improved vibration reduction.

Figure 7:
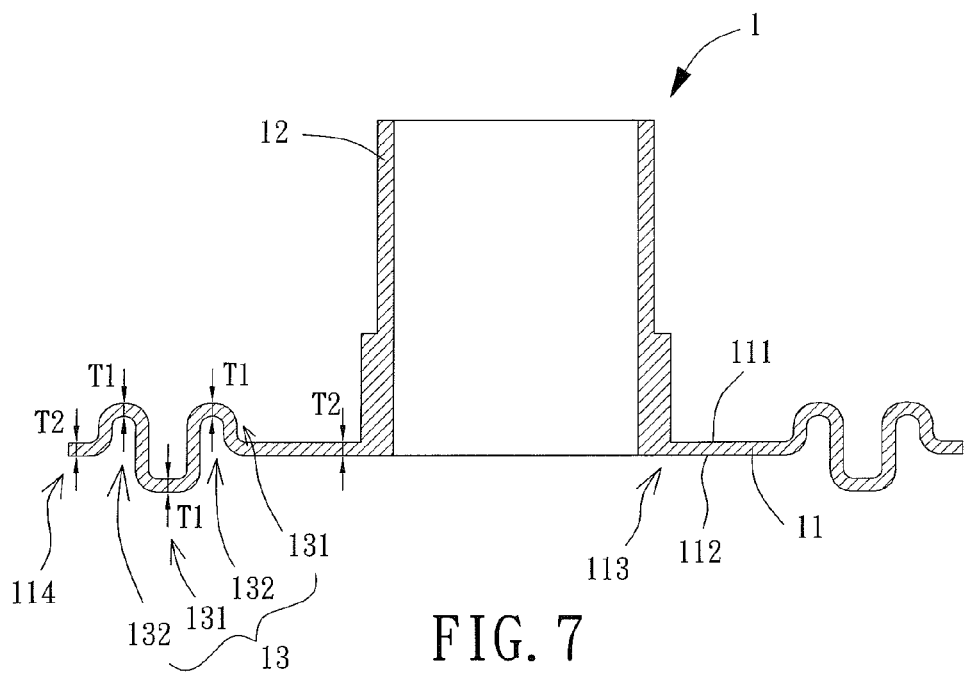
FIG. 7 is a cross-sectional view of the motor base according to a third modification of the preferred embodiment of the invention.

Referring to FIG. 7, the vibration reduction unit 13 includes three protrusions 131 and three grooves 132. Two of the three protrusions 131 and one of the three grooves 132 are arranged on the top surface 111, with the groove 132 positioned between the two protrusions 131. Furthermore, the other two of the three grooves 132 and the other one of the three protrusions 131 are arranged on the bottom surface 112, with the protrusion 131 positioned between the two grooves 132. The two grooves 132 on the bottom surface 112 are opposite to the two protrusions 131 on the top surface 111. The protrusion 131 on the bottom surface 112 is opposite to the groove 132 on the top surface 111. In this arrangement, the grooves 132 and the protrusions 131 may be arranged in an interlaced manner to better reduce the reverberation energy resulting from the vibration of the shaft-coupling portion 12.

Figure 8:
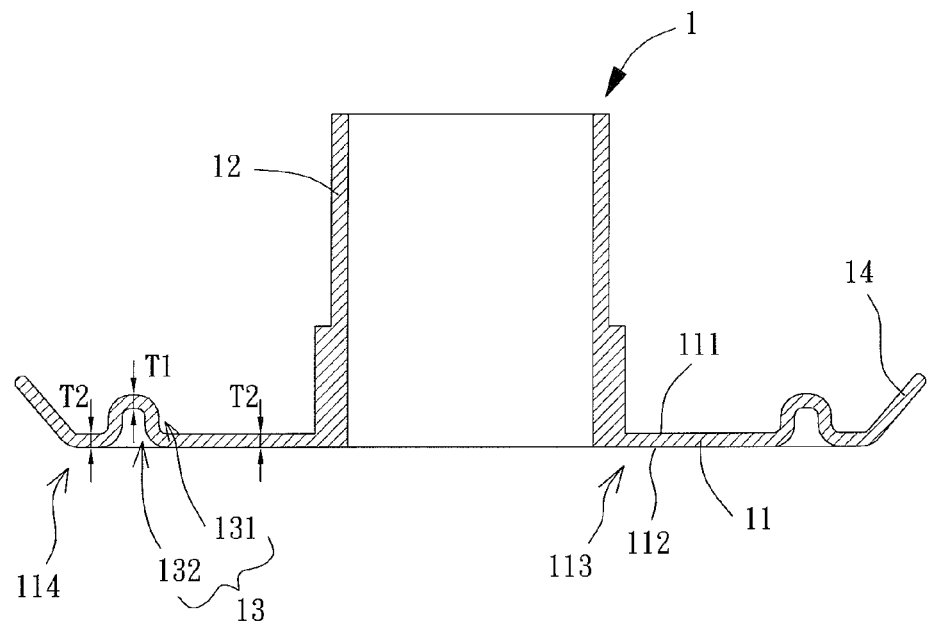
FIG. 8 is a cross-sectional view of the motor base according to a fourth modification of the preferred embodiment of the invention.

Referring to FIG. 8, the vibration reduction unit 13 includes only one protrusion 131 and one groove 132. The protrusion 131 is arranged on the top surface 111 of the bottom plate 11, and the groove 132 is arranged on the bottom surface 112 of the bottom plate 11. The bottom plate 11 includes an inner end portion 113 and an outer end portion 114 opposite to the inner end portion 113. The shaft-coupling portion 12 may be integrally formed with or assembled to the inner end portion 113. The outer end portion 114 extends outwards in the horizontal direction and has a connection portion 14. The connection portion 14 preferably extends in an upward direction perpendicular to the top surface 111 or extends outwards in an oblique angle with respect to the bottom plate 11. However, the extension direction of the connection portion 14 is not limited thereto. In this structure, the connection portion 14 may be coupled with components such as ribs or stationary blades to allow the motor base 1 to be applied to different fan frames with different structures, such as the fan frames of axial fans, blower fans or advection fans (the advection fan is the fan which drives air to flow into and out of the fan in the radial direction). Thus, flexible application of the motor base 1 is achieved.

Referring to FIGS. 5, 6, 7 and 8, the bottom plate 11 has a first thickness T1 and a second thickness T2. The first thickness T1 is the thickness of the bottom plate 11 at the vibration reduction unit 13, and the second thickness T2 is the thickness of the bottom plate 11 at the rest of the portions of the bottom plate 11. The first thickness T1 is preferably the same as the second thickness T2 to form the bottom plate 11 with even thickness, preventing the bottom plate 11 from having a thickness that is smaller than the required thickness of the bottom plate 11. As such, the overall structural strength of the motor base 1 is increased.

Figure 9:
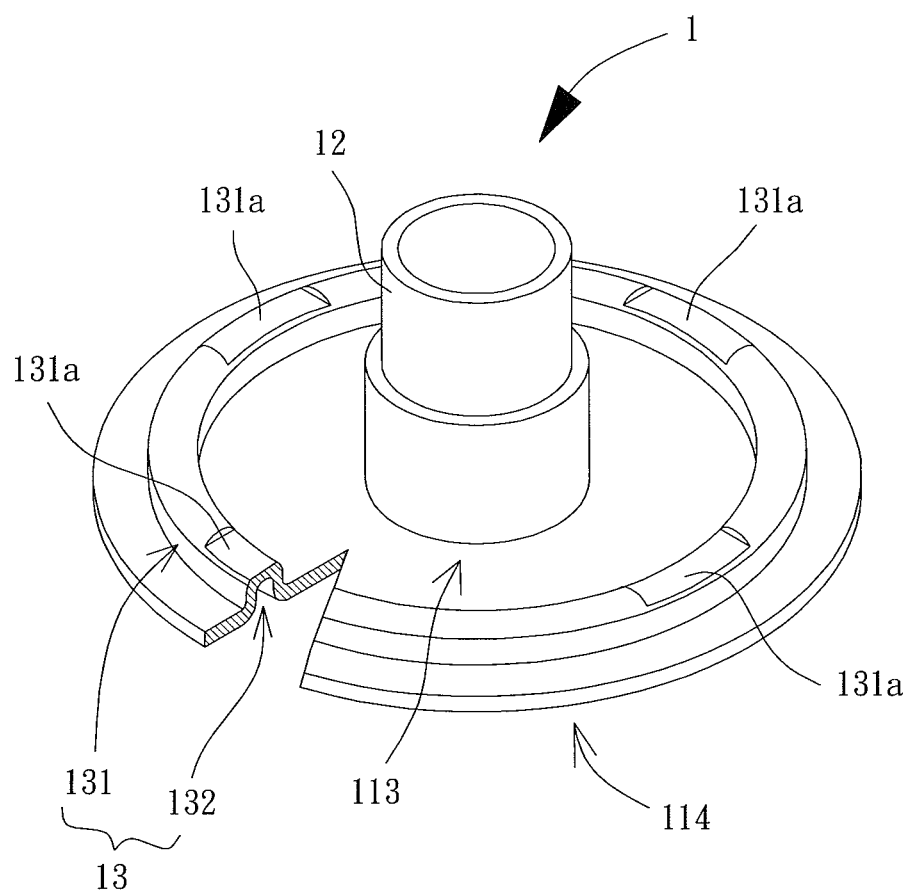
FIG. 9 shows a motor base according to a fifth modification of the preferred embodiment of the invention.
Figure 10:
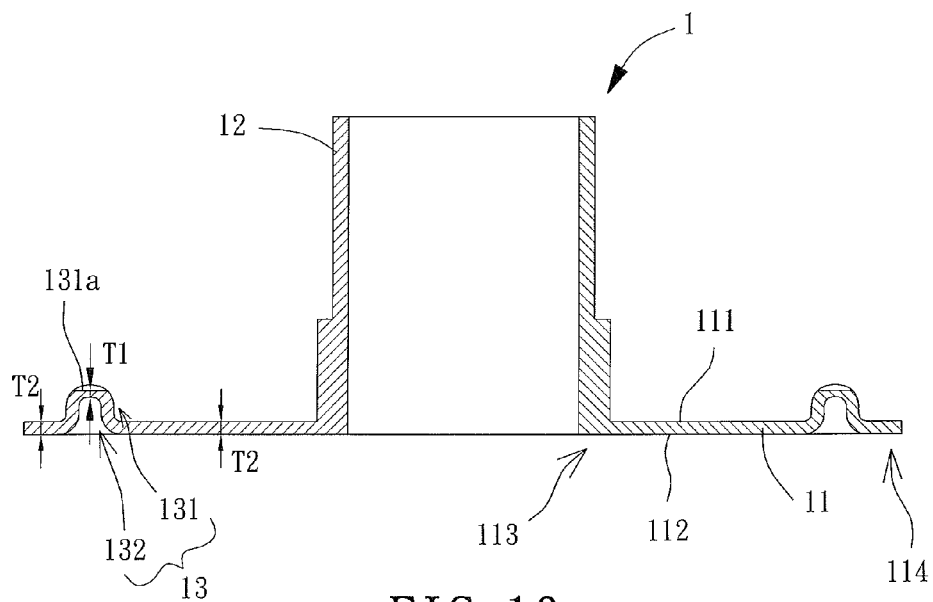
FIG. 10 is a cross-sectional view of the motor base of the fifth modification.

Referring to FIGS. 9 and 10, at least one recess 131 a may be formed on the protrusion 131 of the vibration reduction unit 13. Therefore, the bottom plate 11 has a first thickness T1 and a second thickness T2. The first thickness T1 is the thickness of the motor base 1 at the recess 131a of the vibration reduction unit 13, and the second thickness T2 is the thickness of the motor base 1 at the rest of the portions of the motor base 1. The first thickness T1 is slightly smaller than the second thickness T2. The motor base 1 has an improved vibration and noise reduction system under the arrangement of the recess 131 a.

Figure 11:
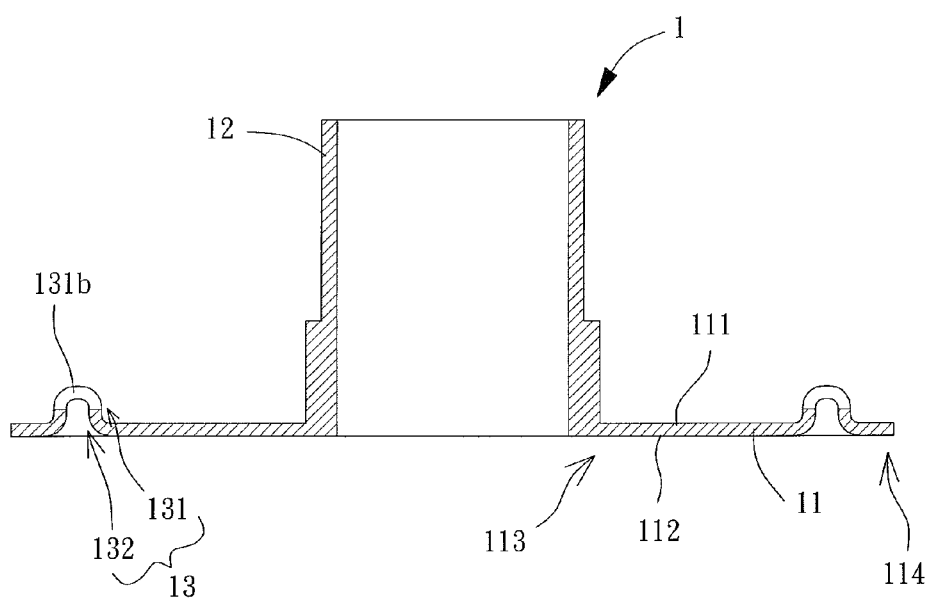
FIG. 11 is a cross-sectional view of the motor base according to a sixth modification of the preferred embodiment of the invention.

Referring to FIG. 11, at least one truncated portion 131b may also be formed on the protrusion 131 of the vibration reduction unit 13. It is noted that in FIG. 11, the truncated portion 131b is formed only on a certain section of the protrusion 131 rather than on the whole section of the protrusion 131. In comparison with the vibration reduction unit 13 in FIGS. 9 and 10, the vibration reduction unit 13 in this embodiment is capable of more efficiently reducing the reverberation energy resulting from the vibration of the shaft-coupling portion 12, achieving improved vibration reduction.

Figure 12:
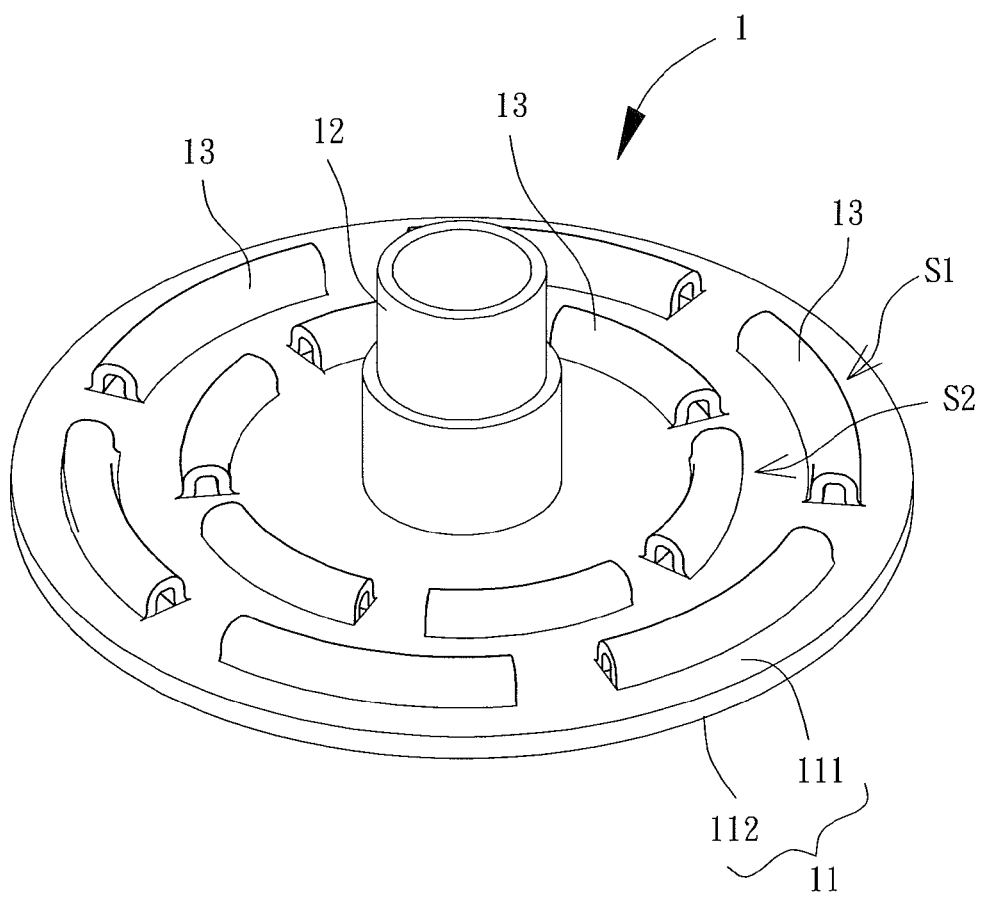
FIG. 12 shows a motor base according to a seventh modification of the preferred embodiment of the invention.

Referring to FIG. 12, the motor base 1 has a plurality of vibration reduction units 13. A portion of the vibration reduction units 13 is arranged along a circular path of an outer ring S 1, and the other portion of the vibration reduction units 13 is arranged along a circular path of an inner ring S2 surrounded by the outer ring S 1. The vibration reduction units 13 of the outer ring Si are annularly spaced from each other by a plurality of gaps. The vibration reduction units 13 of the inner ring S2 are annularly spaced from each other and interlaced with the vibration reduction units 13 of the outer ring S 1. The arc length of each vibration reduction unit 13 of the inner ring S2 is preferably larger than the gap between two adjacent vibration reduction units 13 of the outer ring S1. Thus, similar to the vibration reduction unit 13 shown in FIG. 4, the vibration reduction units 13 in the embodiment is also able to enclose the shaft-coupling portion 12 to achieve improved vibration and noise reduction.

Figure 13:
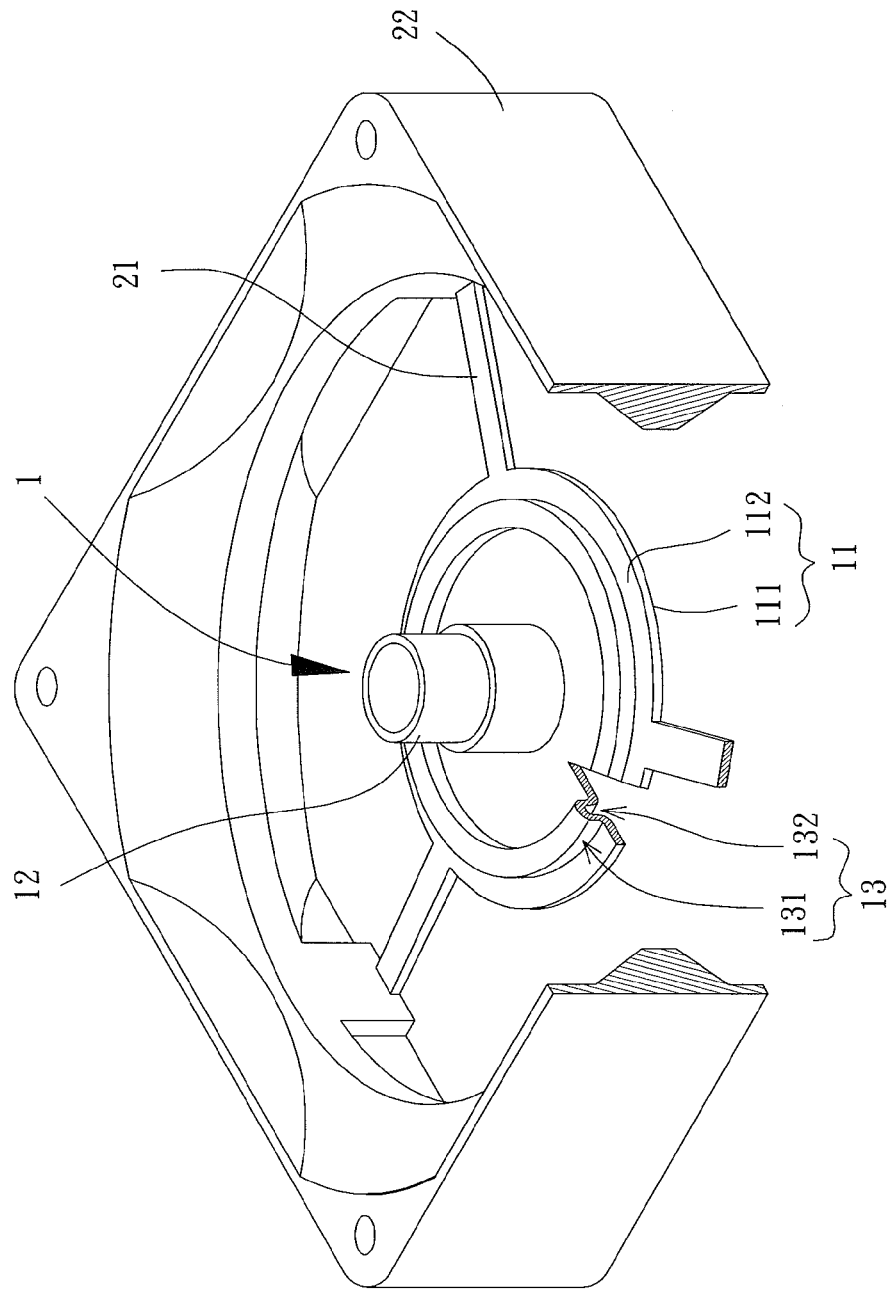
FIG. 13 shows a fan frame of an axial fan equipped with the motor base shown in FIG. 4.
Figure 14:
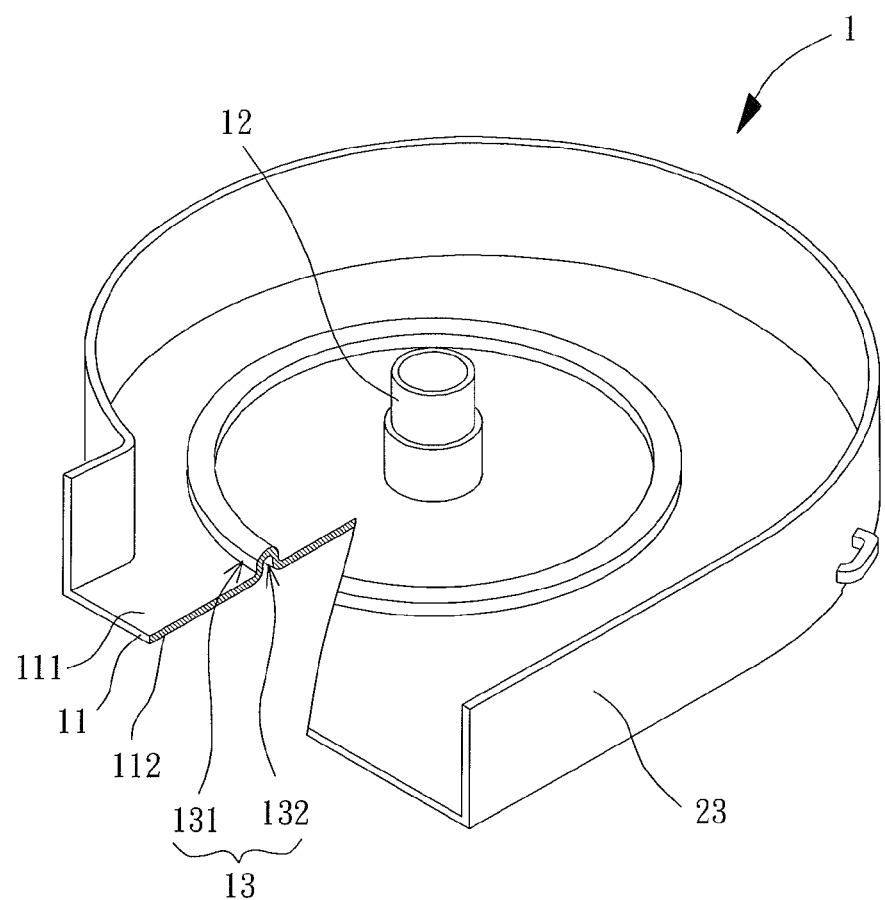
FIG. 14 shows a fan frame of a blower fan equipped with the motor base shown in FIG. 4.

When in use, the motor bases 1 disclosed in the above embodiments can be used to construct the fan frames of a variety of cooling fans. As shown in FIG. 13, the bottome plate 11 of the motor base 1 can be connected to a frame 22, which has an axial inlet and an axial outlet, via a plurality of connection members 21 such as ribs or stationary blades. Thus, a fan frame of an axial fan is formed. Alternatively, as shown in FIG. 14, a lateral wall 23 may be formed on the periphery of the bottom plate 11. The lateral wall 23 may form an axial inlet and a radial outlet. Thus, a fan frame of a blower fan is formed. In general, certain components such as a circuit board (not shown) can be installed in the compartment of the axial fan or the blower fan, while other components such as a stator or an impeller (not shown) may be coupled with the shaft-coupling portion 12. In this manner, a cooling fan may be constructed. The detailed structures and principles of the cooling fan are not described herein again, as it can be readily appreciated by one having ordinary skill in the art. Therefore, the vibration reduction unit 13 of the motor base 1 is able to efficiently reduce the vibrational force of the shaft-coupling portion 12. The vibration reduction unit 13 is also able to reduce the turbulence and noise during the operation of the cooling fan. As such, service lives of the cooling fan and the motor are prolonged.

Figure 2:
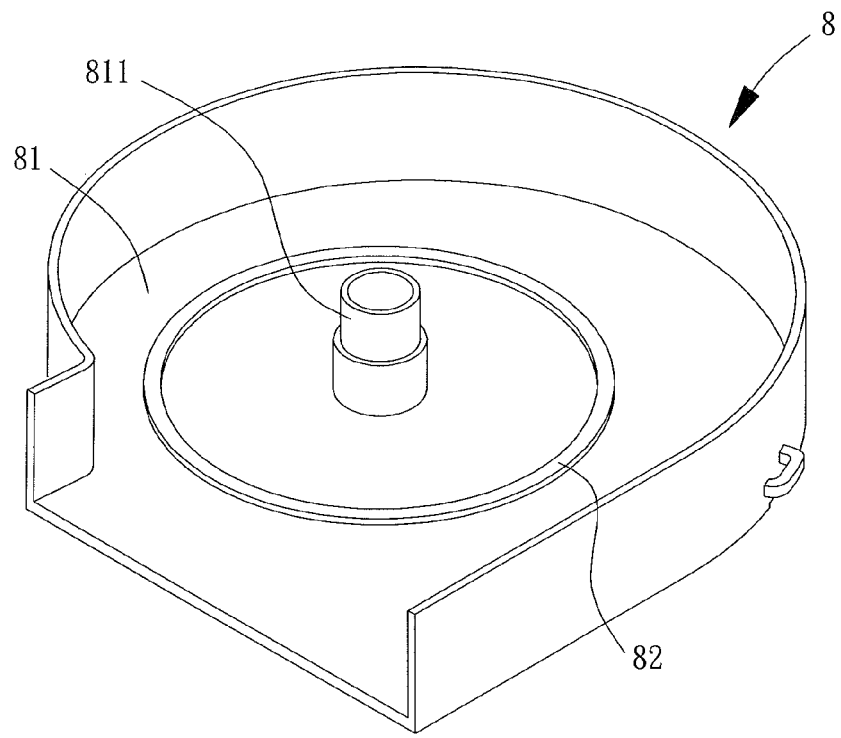
FIG. 2 shows a fan frame of a conventional cooling fan.
Figure 3:
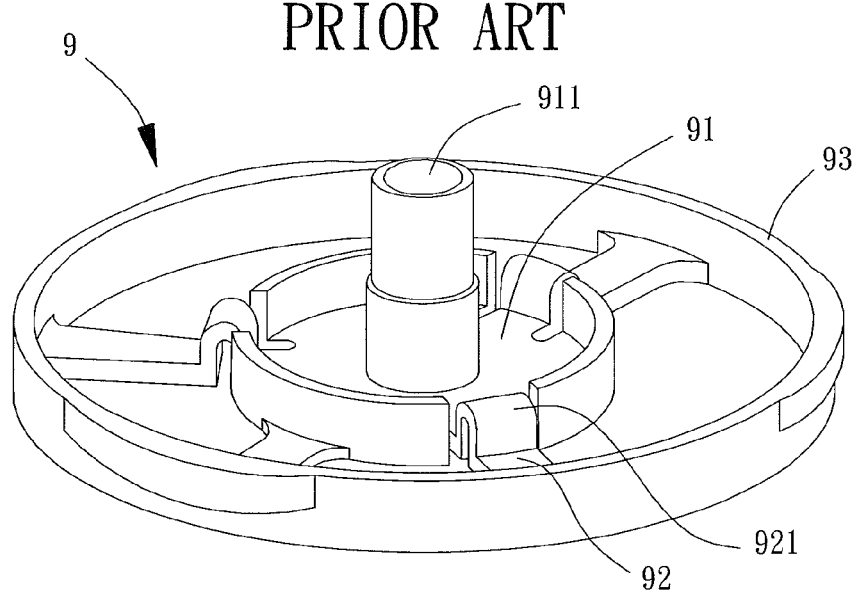
FIG. 3 shows a conventional fan frame.

It can be recognized from the above descriptions that the vibration reduction unit 13 of the motor base 1 has both the protrusion 131 and the groove 132. Since the protrusion 131 and the groove 132 are respectively arranged on the top surface 111 and the bottom surface 112 of the bottom plate 11, the protrusion 131 does ensure that the bottom plate 11 has greater structural strength than the conventional motor base 7 (shown in FIG. 1) as compared with the annular grooves 72 of the motor base 7. Furthermore, in contrast to the separating portion 82 of the fan frame 8 in FIG. 2, the groove 132 of the vibration reduction unit 13 is able to more efficiently reduce the vibrational force of the shaft-coupling portion 12. In other words, the motor bases 1 of the invention have greater structural strengths and better reduce the vibrational force via the protrusion 131 and the groove 132. Moreover, since the vibration reduction unit(s) 13 encloses the shaft-coupling portion 12, the vibration reduction unit(s) 13 is able to omnidirectionally reduce the reverberation energy resulting from the vibration of the shaft-coupling portion 12, thereby reducing the noise of the motor. Improved quality of the cooling fan is therefore achieved.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A motor base comprising:
a bottom plate having opposite top and bottom surfaces, wherein a shaft-coupling portion is arranged on the top surface; and
at least one vibration reduction unit enclosing the shaft-coupling portion, wherein each of the at least one vibration reduction unit comprises at least one protrusion and at least one groove, wherein the at least one protrusion is arranged on one of the top and bottom surfaces, wherein the at least one groove is correspondingly arranged on another one of the top and bottom surfaces, wherein the at least one protrusion comprises a single protrusion arranged on the top surface, wherein the at least one groove comprises a single groove correspondingly arranged on the bottom surface, wherein the bottom plate further comprises an inner end portion and an outer end portion opposite to the inner end portion, wherein the inner end portion is coupled with the shaft-coupling portion, wherein the outer end portion extends outwards in a horizontal direction of the bottom plate, wherein the top surface comprises a first top surface, a second top surface and a third top surface, wherein the first top surface is positioned between the protrusion and the inner end portion, wherein the second top surface is positioned on the protrusion, wherein the third top surface is positioned between the protrusion and the outer end portion, wherein the first and third top surfaces are aligned with each other in a radial direction of the shaft-coupling portion, and wherein the second top surface is not aligned with the first and third top surfaces in the radial direction of the shaft-coupling portion.

2. The motor base as claimed in claim 1, wherein the bottom plate has a first thickness and a second thickness, wherein the first thickness is a thickness of the bottom plate at the at least one vibration reduction unit, wherein the second thickness is a thickness of the bottom plate at other portions of the bottom plate, and wherein the first thickness is equal to the second thickness.

3. The motor base as claimed in claim 1, wherein at least one recess is formed on each of the at least one protrusion.

4. A motor base comprising:
a bottom plate having opposite top and bottom surfaces, wherein a shaft-coupling portion is arranged on the top surface; and
at least one vibration reduction unit enclosing the shaft-coupling portion, wherein each of the at least one vibration reduction unit comprises at least one protrusion and at least one groove, wherein the at least one protrusion is arranged on one of the top and bottom surfaces, wherein the at least one groove is correspondingly arranged on another one of the top and bottom surfaces, wherein the at least one protrusion comprises a single protrusion arranged on the top surface, wherein the at least one groove comprises a single groove correspondingly arranged on the bottom surface, wherein the bottom plate further comprises an inner end portion and an outer end portion opposite to the inner end portion, wherein the inner end portion is coupled with the shaft-coupling portion, wherein the outer end portion extends outwards in a horizontal direction of the bottom plate, wherein the top surface comprises a first top surface, a second top surface and a third top surface, wherein the first top surface is positioned between the protrusion and the inner end portion, wherein the second top surface is positioned on the protrusion, wherein the third top surface is positioned between the protrusion and the outer end portion, and wherein the first, second and third top surfaces are positioned on different planes in an axial direction of the shaft-coupling portion.

5. The motor base as claimed in claim 4, wherein the second top surface is positioned on a plane higher than the first and third top surfaces.

6. A motor base comprising:
a bottom plate having opposite top and bottom surfaces, wherein a shaft-coupling portion is arranged on the top surface; and
at least one vibration reduction unit enclosing the shaft-coupling portion, wherein each of the at least one vibration reduction unit comprises at least one protrusion and at least one groove, wherein the at least one protrusion is arranged on one of the top and bottom surfaces, wherein the at least one groove is correspondingly arranged on another one of the top and bottom surfaces, wherein the at least one protrusion comprises a single protrusion arranged on the top surface, wherein the at least one groove comprises a single groove correspondingly arranged on the bottom surface, wherein the bottom plate further comprises an inner end portion and an outer end portion opposite to the inner end portion, wherein the inner end portion is coupled with the shaft-coupling portion, wherein the outer end portion extends outwards in a horizontal direction of the bottom plate, wherein the outer end portion has a connection portion extending in an upward direction perpendicular to the top surface or extending outwards in an oblique angle with respect to the bottom plate, and wherein the connection portion is adapted to couple with ribs or stationary blades.

7. A motor base comprising:
a bottom plate having opposite top and bottom surfaces, wherein a shaft-coupling portion is arranged on the top surface; and
at least one vibration reduction unit enclosing the shaft-coupling portion, wherein each of the at least one vibration reduction unit comprises at least one protrusion and at least one groove, wherein the at least one protrusion is arranged on one of the top and bottom surfaces, wherein the at least one groove is correspondingly arranged on another one of the top and bottom surfaces, wherein the at least one protrusion comprises three protrusions, wherein the at least one groove comprises three grooves, wherein two of the three protrusions and one of the three grooves are arranged on the top surface, wherein the one of the three grooves that is arranged on the top surface is positioned between the two of the three protrusions that are arranged on the top surface, wherein another two of the three grooves and another one of the three protrusions are arranged on the bottom surface, wherein the one of the three protrusions that is arranged on the bottom surface is positioned between the other two of the three grooves that are arranged on the bottom surface, wherein the other two of the three grooves on the bottom surface are opposite to the two of the three protrusions on the top surface, and wherein the other one of the three protrusions on the bottom surface is opposite to the one of the three grooves on the top surface.

8. A motor base comprising:
a bottom plate having opposite top and bottom surfaces, wherein a shaft-coupling portion is arranged on the top surface; and
at least one vibration reduction unit enclosing the shaft-coupling portion, wherein each of the at least one vibration reduction unit comprises at least one protrusion and at least one groove, wherein the at least one protrusion is arranged on one of the top and bottom surfaces, wherein the at least one groove is correspondingly arranged on another one of the top and bottom surfaces, and wherein at least one truncated portion is formed on each of the at least one protrusion.

9. The motor base as claimed in claim 8, wherein the at least one protrusion comprises a single protrusion arranged on the top surface, and wherein the at least one groove comprises a single groove correspondingly arranged on the bottom surface.

10. A motor base comprising:
a bottom plate having opposite top and bottom surfaces, wherein a shaft-coupling portion is arranged on the top surface; and
at least one vibration reduction unit enclosing the shaft-coupling portion, wherein each of the at least one vibration reduction unit comprises at least one protrusion and at least one groove, wherein the at least one protrusion is arranged on one of the top and bottom surfaces, wherein the at least one groove is correspondingly arranged on another one of the top and bottom surfaces, wherein the at least one vibration reduction unit comprises a plurality of vibration reduction units, wherein a portion of the plurality of vibration reduction units is arranged along a circular path of an outer ring, wherein another portion of the plurality of vibration reduction units is arranged along a circular path of an inner ring surrounded by the outer ring, wherein the plurality of vibration reduction units of the outer ring is annularly spaced from each other by a plurality of gaps, and wherein the plurality of vibration reduction units of the inner ring are annularly spaced from each other and interlaced with the plurality of vibration reduction units of the outer ring.

11. The motor base as claimed in claim 10, wherein an arc length of each vibration reduction unit of the inner ring is larger than a corresponding gap between two adjacent vibration reduction units of the outer ring.

* * * * *